Patented May 30, 1950

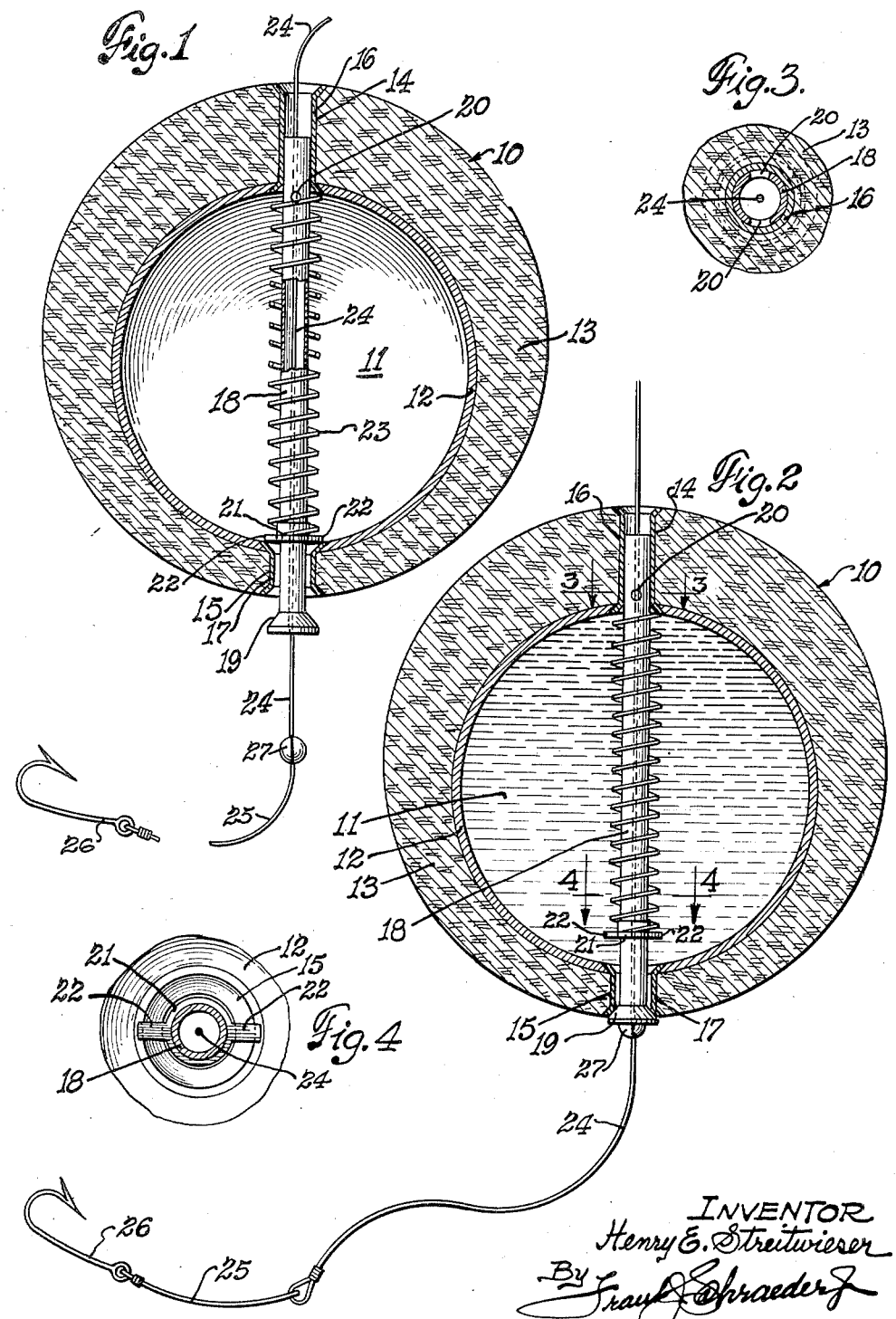

2,509,704

UNITED STATES PATENT OFFICE 2,509,704

COMBINED FLOAT AND CASTING WEIGHT

Henry E. Streitwieser, Venango, Nebr.

Application September 8, 1947, Serial No. 772,733

12 Claims. (Cl. 43—43.12)

The present invention has for its primary object to enable fishermen to make long casts easily and greatly to reduce the danger of losing hooks, sinkers and leaders by reason of snagging on submerged roots and the like while reeling in lines across shallow waters.

In carrying out my invention I provide a temporarily weighted float through which the line extends freely, and through which it is drawn back when reeling, to hold the hook end above the bottom beneath the waters; and it may therefore be said that the present invention has for an object to produce a simple, novel and efficient combined float and casting weight.

By limiting the distance that the line may run down through the float, the latter may be used for bobber fishing with the float remaining stationary while holding the hook suspended at any desired distance below the surface of the water. Consequently, viewed in one of its aspects, the present invention may be said to have for an additional object to produce a float equally well adapted for bobber fishing and for fishing by casting and immediately reeling in the line.

The various features of novelty whereby the present invention is characterized will hereinafter be pointed out with particularity in the claims; but, for a full understanding of the invention and its various objects and advantages, reference may be had to the following detailed description in connection with the accompanying drawing, wherein:

Figure 1 is an axial section on any vertical plane through a device embodying my invention in a preferred form, illustrating it in its normal, idle state; Fig. 2 is a view similar to Fig. 1, showing the device full of water and ready for making a cast; Fig. 3 is a section, on a larger scale, on line 3—3 of Fig. 2, showing only a small fragment of the device; and Fig. 4 is a section, on the same scale as Fig. 3, taken on line 4—4 of Fig. 2, and also showing only a small fragment.

In the drawing, 10 represents a float body member comprising a wall or shell which completely surrounds a large free space or chamber 11. The wall or shell must be lighter than a like mass of water; the relative weights being such that a portion of the body member, even though said member is filled with water, will stand above the surface of a body of water into which said member may be cast. Furthermore, the chamber must be so disposed that the wall or shell is materially thicker on one side than at a point diametrically opposite. As a result of this condition, when the float is filled with water and dropped into a body of water, the thick part of the wall will be on top and the thin part on the under side. The thickest part of the wall may therefore be said to be the top of the float and the thinnest part the bottom.

The body member may take any desired shape. I prefer a spherical shape and have illustrated only that form. There are innumerable ways in which the wall or shell may be constructed, and any one or more of a great variety of materials may be used. In the arrangement shown, there is a core element 12 in the form of a hollow, thin-walled ball that may conveniently be made of rubber or any suitable plastic material. What lies between the periphery of the core and the outer surface of the body member is not important so long as the weight of the wall as a whole, relatively to water, remains low. In the arrangement shown, the core is embedded in a solid mass 13 of cork. The core is, therefore, a sphere eccentrically disposed within a larger sphere.

The composite wall of the body member contains passages 14 and 15 extending through the same in alignment with each other at the ends of the vertical axis of the body member; passage 14 being at the top and the other passage being at the bottom. Bushings 16 and 17 are preferably used to line these respective passages.

Extending axially through the body member, and slidable lengthwise in the bushings, is a tube 18 that is open at both ends. The upper bushing is preferably a fairly close fit on the tube so that the latter forms a closure or stopper therefor. The lower bushing 17 and the tube cooperate to allow water to enter and leave chamber 11 through this bushing around the outside of the tube. A simple way of doing this is to make the bushing larger in internal diameter than the external diameter of the tube. The lower end of the tube is flared as at 19, to serve as a valve to close the lower end of bushing 17 when the tube is drawn up. Consequently, when the tube is raised as far as it will go, both passages between the chamber 11 and the surrounding medium are closed; although it is not necessary that the closure at the top be as tight as that at the bottom. The tube has in the upper part thereof one or more ports 20 so located that when valve 19 is closed the ports are covered by the upper bushing as in Fig. 2; whereas, when the tube is lowered to unseat valve 19, as in Fig. 1, the ports 20 move down clear of the upper bushing, permitting air to enter the upper passage and the tube, and to pass freely from the tube through the ports into chamber 11.

Suitable means, aside from the weight of the tube, are provided yieldingly to hold the tube lowered except when outside constrain is applied. In the arrangement shown, the tube has on the same, within chamber 11 and not far from the chamber bottom, a suitable stop or shoulder that may comprise a ring 21 provided with radially disposed projecting fingers 22; the ring being of smaller diameter than the inside of the lower bushing and the fingers being long enough to span and rest upon the upper end of this bushing when the tube is lowered to open the valve. This stop does not interfere with the flow of water into and out of chamber 11. Surrounding the tube within said chamber, resting on the ring and bearing at its upper end against the lower end of the upper bushing, is a light coiled spring 23. The spring is under initial compression so that, whenever not opposed by outside forces, it holds the tube in the lowered position which it occupies in Fig. 1.

Any conventional fish line 24 may be threaded through the tube, from the top down to and through the bottom; leader 25 and hook 26 being attached to the line below the float. Any suitable stop may be fixed on the line below the float, not far from the leader. In the arrangement shown, this stop is simply a round shot 27 that has been split deeply enough to receive the line and has then been closed tightly on the line to grip the same. When the line is held so that the float dangles therefrom, the spring yields, particularly when the float contains some water, and the float moves down until stopped by valve 19. When the line is allowed to become slack the spring comes into play and opens the valve again.

In using the device after being applied to the line, it is lowered by the latter into a body of water where it will float. As the line is slackened the valve at the bottom of the float opens and water enters chamber 11, a compensating amount of air escaping through ports 29 which are now left uncovered. The line is then pulled up, closing the valve at the bottom of the float and preventing the water from escaping out through the lower passage. At the same time the ports 29 move up into the upper bushing and are closed thereby, so that the water in the float cannot splash out at the top while the line is being handled in the usual way in making a cast. All that the fisherman need do while preparing to make a cast is to be sure to keep the line taut until the float is on its way over the water.

Because the center of gravity of the water filled float is more than half way down from the top, the float lands on the water right side up and remains afloat in that position. As the tension on the line is relieved, the spring in the float drives the tube down into the position indicated in Fig. 1, opening valve 19 and allowing the water in the float to seek the level of the body of water in which the float is resting. Simultaneously with the opening of valve 19, as the tube moves down, the ports 29 emerge from the lower end of the upper bushing so that air from above may freely enter the chamber through these ports. Consequently water flows freely out of the float until a state of equilibrium is reached. As water empties out of the float the latter becomes lighter and rises. Then, when the line is reeled in, with the valve 19 again closed because the line has been drawn taut, the hook is held a little higher from the bottom under the water than was the case at the time the hook settled as the float first came to rest on the water. Consequently, the hook is held up high enough to cause the danger of losing hook, leader and/or sinker during the reeling in of the line to be reduced to a minimum.

In using the float for bobber fishing, a second stop, not shown but which may be similar to stop 27, or of any other type, is attached to the line above the float at a point that will allow the hook to sink to the desired depth before this second stop engages the upper end of the upper bushing and comes to rest. In this type of fishing, the fisherman obtains the benefits resulting from a light float that may temporarily be made much heavier for casting purposes and, at the same time makes possible relatively deep fishing with the assurance that the hook will be drawn only a short distance below the surface while reeling in the line.

While I have illustrated and described with particularity only a single preferred form of my invention, I do not desire to be limited to the exact structural details so illustrated and described; but intend to cover all forms and arrangements coming within the definitions of the invention constituting the appended claims.

I claim:

1. A float containing an internal chamber and passages opening out to the exterior from the chamber at the top and at the bottom, a valve device for the bottom passage that includes a self-closing valve containing an opening through the same, a line extending loosely down through both said upper passage and said opening in the valve, and a stop on said line below the valve in position to engage the valve device and move it into closed position when the line is drawn up and becomes taut.

2. The combination as set forth in claim 1, wherein the valve device is an open ended tube slidable in said passages and has an upwardly seating valve at its lower end for engagement with said float, wherein the tube is of substantially lesser diameter than the bottom passage, and wherein the line runs through the tube.

3. The combination as set forth in claim 1, wherein the float is composed of a thin-walled hollow spherical core and a surrounding layer of cork so disposed that the outer surface of the float is a sphere eccentric to the core, with the passages from the interior of the float located at the axis that intersects the thickest and the thinnest portions of the cork layer.

4. A combination float and weight device comprising a hollow body the wall of which is lighter than water and is thicker at the top than at the bottom; said wall having at the vertical axis passages that extend through the top and the bottom; an open ended tube, large enough in diameter to permit a fishing line element to pass freely through the same, extending through the body and slidable in said passages; said tube having at its lower end an upwardly seating valve to close the lower passage when the tube is drawn up; and means acting constantly on said tube to move it down and open the lower passage.

5. A combination float and weight as set forth in claim 4, wherein the upper passage contains a bushing that is a close fit on the tube and wherein the tube contains near its upper end a port that is below the bushing when the tube is down and is covered by the bushing when the tube is up and the valve closed.

6. A combination float and weight as set forth in claim 5, wherein the tube has thereon, within the body member, a projection to limit its downward movement and wherein the means tending to move the tube down is a coiled spring surrounding the tube, resting on said projection and bearing at its upper end against the overlying wall.

7. In combination, a float and weight device comprising a hollow body the wall of which is lighter than water and is thicker at the top than at the bottom; said wall having at the vertical axis passages extending from the interior through the top and bottom; and open ended tube axially extending through said body and slidable in said passages; said tube having thereon an upwardly seating valve to close the lower passage; means within the interior of said body tending constantly to move the tube downward to open the lower passage; and a line element extending freely through the tube and having thereon a part to engage the valved end of the tube and move it lengthwise in the direction to seat the valve when the line element is drawn up.

8. In combination, a float and weight device comprising a hollow body the wall of which is lighter than water and is thicker at the top than at the bottom; said wall having at the vertical axis passages extending through the top and bottom; an open ended tube extending through said body and being a fairly close slidable fit in the upper passage and being much looser in the lower passage; said tube having thereon an upwardly seating valve to close the lower passage; a spring within the device tending constantly to move the tube down to open the lower passage; said tube containing a port that opens into the interior of the body when the valve is open and lies in the upper passage when the valve is closed; and a line element extending freely through the tube and having thereon a part to engage the valved end of the tube and move it up to seat the valve when the line element is drawn up.

9. In combination, a float and weight device comprising a body formed of a hollow ball and material surrounding the same to create therewith a wall that is lighter than water and the outer surface of which is a sphere eccentric with respect to said ball; said wall having passages extending through the thickest and the thinnest parts thereof in axial alignment with each other; and open ended tube extending through said body and slidable in said passages, said tube having thereon an inwardly seating valve to close the passage in the thinner part of the wall; a spring within the ball tending constantly to move the tube lengthwise into position to open the latter passage; and a line element extending freely through the tube and having thereon a part to engage the valved end of the tube and move it lengthwise in the direction to seat the valve when the line element is drawn taut.

10. In combination, a float and weight device comprising a body formed of a thin-walled hallow ball and material surrounding the same to create therewith a thick wall that is lighter than water and the outer surface of which is a sphere eccentric with respect to said ball; said thick wall having passages extending through the thickest and the thinnest parts thereof in axial alignment with each other; an open ended tube extending through said body and slidable in said passages; said tube having thereon an inwardly seating valve to close the passage in the thinner part of the wall, the latter passage and the tube being shaped to establish communication between the interior of the ball and the outside when the valve is open; a spring within the ball tending constantly to move the tube lengthwise into position to open the passage controlled by said valve; and a line element extending freely through the tube and having thereon a part to engage the valved end of the tube and move it lengthwise in the direction to seat the valve when the line element is drawn taut.

11. A float that is lighter than water and contains an internal chamber that may be filled with water to cause it to sink, said float containing passages opening out to the exterior from the chamber at the top and bottom, an upwardly seating valve for the bottom passage tending constantly to open and containing an opening therethrough, means to limit the opening movement of the valve, a line extending loosely down through both of said passages and said opening in the valve, and a stop on said line to engage the valve and close it when the line is drawn up and becomes taut.

12. A float comprising a spherical body member containing two separate spherical chambers one within the other and the outer one of which is sealed against the entrance of water thereinto, said body member containing diametrically oppositely disposed upper and lower passages opening out from the inner chamber to the exterior at the top and bottom of said body member, an upwardly seating self-opening reciprocable valve for said lower passage, means to limit the movements of said valve, said valve having an opening through the same in registration with said lower passage, a line extending loosely through said passages and said opening in the valve, and a stop on the line below said valve adapted to engage and move said valve into closed position when the line is drawn up and becomes taut.

HENRY E. STREITWIESER.

REFERENCES CITED

The following references are of record in the file of this patent:

UNITED STATES PATENTS

| Number | Name | Date |
| --- | --- | --- |
| 771,263 | McCord | Oct. 4, 1904 |
| 1,917,967 | Green | July 11, 1933 |

FOREIGN PATENTS

| Number | Country | Date |
| --- | --- | --- |
| 510,028 | Great Britain | July 26, 1939 |